United States Patent [19]

Husslein et al.

[11] 4,210,124
[45] Jul. 1, 1980

[54] DISH FOR HOLDING FOOD TO BE HEATED IN A MICROWAVE COOKING CHAMBER

[75] Inventors: Julius Husslein, Vachendorf; Wilhelm Hertel, Traunreut, both of Fed. Rep. of Germany

[73] Assignee: Bosch-Siemens Hausgerate GmbH, Stuttgart, Fed. Rep. of Germany

[21] Appl. No.: 972,250

[22] Filed: Dec. 22, 1978

Related U.S. Application Data

[62] Division of Ser. No. 746,335, Dec. 1, 1976, Pat. No. 4,143,647.

[30] Foreign Application Priority Data

Dec. 29, 1975 [DE] Fed. Rep. of Germany ....... 2555344

[51] Int. Cl.² ............................................. A47J 27/00
[52] U.S. Cl. ............................. 126/390; 219/10.55 E
[58] Field of Search ................ 126/390; 165/137, 134; 219/10.55 E, 10.55 F; 426/107, 423, 434

[56] References Cited

U.S. PATENT DOCUMENTS

| 3,302,632 | 2/1967 | Fichtner | 126/390 |
| 3,941,967 | 3/1976 | Sumi | 219/10.55 E |
| 4,003,368 | 1/1977 | Maxel | 126/390 |
| 4,143,647 | 3/1979 | Husslein | 126/390 |

*Primary Examiner*—Samuel Scott
*Assistant Examiner*—G. Anderson
*Attorney, Agent, or Firm*—Herbert L. Lerner

[57] ABSTRACT

Dish for holding food to be heated in a microwave cooking chamber in which the dish bowl provided for holding the food is made to obtain high absorption of high-frequency radiation and the handles and/or base are made to obtain low absorption of high-frequency radiation. In one form the dish has two dish bowls with a common bottom wall, and with one dish bowl having its inner surface covered with a high-frequency radiation-absorbing coating, and the other dish bowl having its inner surface covered with a high-frequency radiation-reflecting coating.

2 Claims, 2 Drawing Figures

DISH FOR HOLDING FOOD TO BE HEATED IN A MICROWAVE COOKING CHAMBER

This is a division of application Ser. No. 746,335, filed Dec. 1, 1976, now U.S. Pat. No. 4,143,647.

BACKGROUND OF THE INVENTION

1. Field of the Invention

This invention relates to a dish and more particularly refers to a new and improved dish for holding food to be heated in the cooking chamber of a microwave oven.

2. Description of the Prior Art

Customarily, dishes used for microwave ovens have only a relatively low loss factor as compared to liquids and food such as meat, vegetables, fruit etc., i.e. the material of these dishes absorbs the high-frequency radiation of an alternating high-frequency field only to a very small extent. The material used for these dishes is therefore permeable to high-frequency radiation and is heated only insignificantly by the high-frequency radiation during the treatment of the food. This has the advantage that the dish can be touched without hesitation with the bare hand at the handles or carrying edges provided. But on the other hand, there is the disadvantage that the heated food, after the dish is taken out of the microwave cooking chamber, gives off its heat relatively fast to the dish because of the large thermal gradient between the food and the dish, and therefore the food cools down fast. This disadvantage is troublesome particularly if, as customary, the heated food is served in this dish, i.e. remains in this dish for direct consumption.

SUMMARY OF THE INVENTION

An object of the present invention is to provide a dish of the type mentioned at the outset, which has on the one hand adequate thermal storage capacity and in which, on the other hand, the parts of the dish provided for picking up or setting down are not, or only insignificantly, heated up by the high-frequency radiation.

With the foregoing and other objects in view, there is provided in accordance with the invention a dish for holding food to be heated in a microwave cooking chamber including a dish bowl of material with high absorption of high-frequency radiation whereby both the dish bowl and the food contained in the dish bowl when placed in a microwave cooking chamber are heated by absorption of high-frequency radiation in the microwave cooking chamber, and a handle extending from the dish bowl, of material with low absorption of high-frequency radiation whereby the handle remains cool when the dish is placed in the microwave cooking chamber.

In accordance with the invention there is provided a dish for holding food to be heated in a microwave cooking chamber including a dish bowl, a base extending down from the dish bowl, the base forming the side wall of a second dish bowl arranged substantially mirror-symmetrically to the first dish bowl, the first dish bowl having its inner surface covered with a high-frequency radiation-absorbing coating, and the second dish bowl havings its inner surface covered with a high-frequency radiation-reflecting coating.

Other features which are considered as characteristic for the invention are set forth in the appended claims.

Although the invention is illustrated and described herein as embodied in a dish for holding food to be heated in a microwave cooking chamber, it is nevertheless not intended to be limited to the details shown, since various modifiactions may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is a cross-sectional view of a pot-shaped dish having a dish bowl, an upper gripping rim and a lower base; and FIG. 2 is a cross-sectional view of a dish having two dish bowls arranged mirror-symetrically, with a common bottom.

DETAILED DESCRIPTION OF THE INVENTION

In accordance with the invention the dish bowl provided for holding the food contains material with high-frequency radiation-absorption characteristic, while its handles and/or base parts contain material with low-frequency radiation-absorption characteristics. Thereby, the dish bowl immediately surrounding the food is heated by the high-frequency radiation to such an extent that there is no, or only a small, thermal gradient between the heated food and the dish material, which means that the food is protected against rapidly cooling down. On the other hand, the handles which embrace the pick-up edges provided for handling, and the base which includes the legs for setting down or the base rims of the dish, remain relatively cool, so that the dish can be touched without hesitation and the setting-down area, e.g. the table surface, is protected against excessive thermal stress.

In one preferred form the base portion of a dish bowl forms the side wall of a second dish bowl, which is arranged substantially mirror-symmetrically to the first-mentioned dish bowl. The inside surface of one dish bowl is provided with a coating reflecting to a high degree high-frequency radiation; and the surface of the other dish bowl is covered with a radiation-absorbing coating, for instance, of tin oxide, which absorbs to a high degree high-frequency radiation. The coating on the surface of the first-mentioned dish bowl may have an absorptivity such that browning of the food to be cooked can be accomplished in the high-frequency field. However, the reflecting coating, which for instance, consists of metal foil, protects the base portion of the mentioned dish bowl and at the same time the second dish bowl against the effects of the high-frequency radiation. The second dish bowl can be used for just warming or for thawing frozen food. Here the reflecting coating protects to a large extent the first dish bowl, which now serves as the base portion, from the high-frequency radiation.

Figure 1:
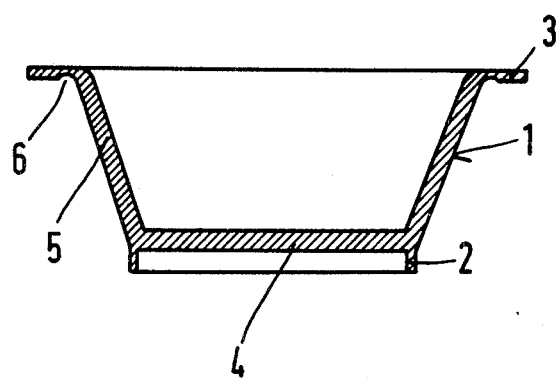

Referring to FIG. 1, a cross-sectional view of a pot-shaped dish is shown, composed of a dish bowl 1 for holding the food to be heated, a lower base portion 2 and an upper gripping rim 3. The dish bowl 1 and its bottom 4 and vessel wall 5, respectively, are made with relatively thick walls and consist of a material with relatively high absorptivity for the high-frequency radiation used in a microwave cooking chamber. The figure shows clearly that the gripping rim 3 as well as the base portion 2 are made with relatively thin walls, with the gripping rim 3 being connected to the dish tray 1 via a reduced transition cross section at 6. The gripping rim 3 as well as the base portion 2 consist of a material which has low absorptivity for radiation. The different absorptivity can be obtained by making the mentioned parts of the dish with different thicknesses or additionally by using different materials for these parts. Thus, the dish bowl can consist, for instance, of porcelain which has relatively high absorptivity, i.e. a high loss factor, while low-absorption materials such as fused silica, polystyrene or the like are used for the handles and base portions.

After the food is treated in the microwave cooking chamber, the dish bowl 1 is highly heated, whereby no or only a small thermal gradient is set up with respect to the food. This prevents the food from cooling down fast, which is important particularly if the food is served in the same dish. At the same time, however, the gripping rim 3 and the base portion 2 are relatively cool, so that the dish can be touched by the bare hand without hesitation and be placed on the table, without burning or causing excessive thermal stress of the set-down surface.

The absorptivity and therewith, the loss factor can also be influenced by providing the material of the different parts of the dish with a thin, more or less radiation-reflecting or radiation-absorbing surface coating.

Figure 2:
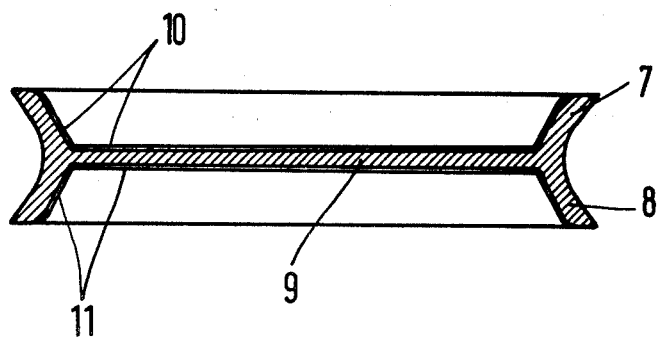

In the embodiment example according to FIG. 2, a dish that can be used on both sides has, in the figure, an upper dish tray 7 as well as a second dish tray 8 arranged mirror-symmetrically thereto, with a common bottom 9. Depending on the manner of placement, the lateral vessel wall of the lower dish tray, respectively, forms the base portion for the top-side dish tray. The inside surface of the dish tray 7 is covered with a strongly radiation-absorbing, thin coating 10, e.g. with an evaporated tin oxide coating, while the surface of the dish tray 8 has a strongly radiation-reflecting coating 11, for instance, in the form of a metal foil.

There are claimed:

1. A dish for holding food to be heated in a microwave cooking chamber comprising a dish bowl, a base extending down from said dish bowl, said base forming the side wall of a second dish bowl arranged substantially mirror-symmetrically to said first dish bowl, said first dish having its inner surface covered with a high-frequency radiation coating, and said second dish bowl having its inner surface covered with a high-frequency radiation-reflecting coating.

2. A dish for holding food according to claim 1, wherein said radiation-absorbing coating is tin oxide and said radiation-reflecting coating is a metal foil.

* * * * *